United States Patent [19]

Hojo

[11] Patent Number: 5,198,048
[45] Date of Patent: Mar. 30, 1993

[54] STUD UNIT AND SKID-PROOF TIRE HAVING THE SAME

[76] Inventor: Hiroo Hojo, 16-14, Miwa 8-chome, Nagano-shi, Nagano 380, Japan

[21] Appl. No.: 596,135

[22] PCT Filed: Feb. 22, 1990

[86] PCT No.: PCT/JP90/00217
§ 371 Date: Oct. 11, 1990
§ 102(e) Date: Oct. 11, 1990

[87] PCT Pub. No.: WO90/09899
PCT Pub. Date: Sep. 7, 1990

[30] Foreign Application Priority Data

Feb. 23, 1989 [JP] Japan ................................. 1-44275

[51] Int. Cl.$^5$ ............................................. B60C 11/16
[52] U.S. Cl. ..................................... 152/210; 152/169
[58] Field of Search ..................... 152/210, 211, 169

[56] References Cited

U.S. PATENT DOCUMENTS 4,875,515 10/1989 Suvanto .............................. 152/210

FOREIGN PATENT DOCUMENTS 2204074 8/1973 Fed. Rep. of Germany ...... 152/210
3739422 5/1988 Fed. Rep. of Germany ...... 152/210
186704 10/1984 Japan.

Primary Examiner—Michael W. Ball
Assistant Examiner—Francis J. Lorin
Attorney, Agent, or Firm—Jordan and Hamburg

[57] ABSTRACT

The stud unit of the present invention is used for skid-proof tires of vehicles. On a snow- or ice-covered road, a force acts on a front end of a stud contacting the road when the vehicle is braked or accelerates and the tire treads consequently slip, so that the stud is kept projecting from a cylinder due to mutual engagement of the stud and the cylinder. On a dry road, the treads of the tire hold the road without slipping, so that no force acts on the stud to cause it to incline, and the stud can smoothly retract into the cylinder.

2 Claims, 10 Drawing Sheets

STUD UNIT AND SKID-PROOF TIRE HAVING THE SAME

BACKGROUND OF THE INVENTION

The present invention relates to a stud unit and a skid-proof tire having the stud units for preventing vehicles from slipping on snow- or ice-covered roads.

Conventionally, snow tires having multiple studs on the outer circumferential face are used as skid-proof tires.

However, studs of the snow tires grind surfaces of roads when vehicles having the snow tires run on a road whose surface is dry and exposed. Powdered dust, which is worn from roads by grinding with studs of the snow tires, is blown up in the atmosphere and causes air pollution. The powdered dust is harmful for our health because it includes such harmful heavy metals as cadmium, lead, and the like. Further, traffic signs painted on roads are worn off by studs of the snow tires, which will be a factor in traffic accidents, and a heavy expenditure for repairing the road signs will be required.

To avoid the above noted disadvantages, recently, studless-tires are being used. The studless-tire is a type of snow tire. It is made of specially composed rubber which does not become hard even at low temperature and has multiple narrow grooves on the outer circumferential face thereof so as to increase contact area with the road and to increase friction therebetween. Note that the friction of the studless-tire with the road is not less than that of conventional snow tires having studs when the temperature is quite low; the friction of the studless-tire with the road decreases when the temperature comes close to 0° C. The frictional function is undermined by ice or snow on the road. Mixing a low-temperature plasticizer with tire rubber to soften treads of tires at low temperature is know but this property continues for only about one year, after which the tread becomes quite hard.

As another means, melting snow and ice on roads by spraying calcium chloride and the like is attempted but roadside trees are blighted and secondary pollution, such as water pollution, occurs.

To solve these disadvantages, a skid-proof tire having stud units was disclosed in the Japanese Patent Provisional Publication (Kokai) Gazette No. 59-186704. Each stud unit thereof shown in FIG. 23 has a cylinder 2 and an elastic member 3 of such material as rubber therein. A stud 5 is passed through a hole 3a, which is bored in the center of the elastic member 3. The rear end of the stud 5 is engaged with an inside face of rear wall 2a of the cylinder 2. There is formed a large-neck section 6 at the front end of the stud 5, and the large-neck section 6 projects forward from the front opening of the cylinder 2.

In operating a vehicle having tires with many studs 5 on a road whose surface is clear, when the brakes are applied each stud 5 is inclined and the large-neck section 6 engages the front end wall of the cylinder 2 to prevent the stud 5 from being pushed inwards, whereby the front end of each stud 5 projects from the tread face of the tires until the vehicle stops, so that the surface of the road is substantially ground.

It is necessary that the diameter of the shaft of the stud 5 be large because a great force is applied to the stud 5 in the direction of its inclination when the vehicle accelerates or is braked. But, if the shaft of the stud 5 is larger, the elastic member 3 and the cylinder 2 must be larger, so that each stud unit must be heavy.

When the stud 5 is inclined, the elastic member 3 is sometimes clipped as in a jaw between the underside of the large-neck section 6 and the front end wall of the cylinder 2.

Because the durability and stability of the elastic member are low, the elastic member is apt to be permanently deformed by frequent inclination of the stud 5, so that the stud 5 sometimes will not return to the center.

Further, studs made of shape-memory alloy have been proposed so as to project and to retract by themselves but they have problems about stable function, cost, and durability, so that they have not been realized.

SUMMARY OF THE INVENTION

An object of the present invention is to provide a stud unit which is capable of adjusting the function of a stud with respect to condition of roads according to the coefficient of the friction between the surface thereof and the tire treads, and a skid-proof tire having the stud unit.

To overcome the above described disadvantages, the present invention has following structure.

A stud unit according to the invention comprises a stud axially reciprocally received in a hollow cylinder having a closed end and an open end and biased outwardly by an elastic element in the cylinder between the closed end of the cylinder and an end of the stud so that when the stud unit is installed in a hole bored in a tire tread radially with the inner end of the cylinder being the closed end, the stud projecting from the tire tread when not in contact with a dry road but being forced into the cylinder by the weight of the vehicle to be substantially flush with the tread when in contact with the dry road. The stud and cylinder are provided with mutually engaging surfaces to prevent the stud from being projected entirely out of the cylinder. The stud is received in the cylinder with play and the cylinder has an axially extending section in which the inner circumference of the cylinder is non-circular and the stud has a corresponding section also having a non-circular circumference. When the tread slips, for example on ice or snow, a horizontal force is applied to a stud in contact with the icy or snowy road surface by that surface, and in the direction opposite slipping of the tread, to incline the stud so that a portion of the end thereof radially outward relative to the tire engages a portion of the non-circular inner circumference of the cylinder to provide sufficient friction between the stud and the cylinder to retain the stud in a position in which it projects outwardly from the tire tread, biting into the icy or snowy surface.

A skid-proof tire is made by fitting a plurality of the studs having above noted structure in holes bored in an outer circumferential face of a tire.

BRIEF DESCRIPTION OF THE DRAWINGS

Embodiments of the present invention will now be described by way of example and with reference to the accompanying drawings, in which.

DETAILED DESCRIPTION OF PREFERRED EMBODIMENTS

Preferred embodiments of the present invention will now be described with reference to the accompanying drawings.

Figure 1:
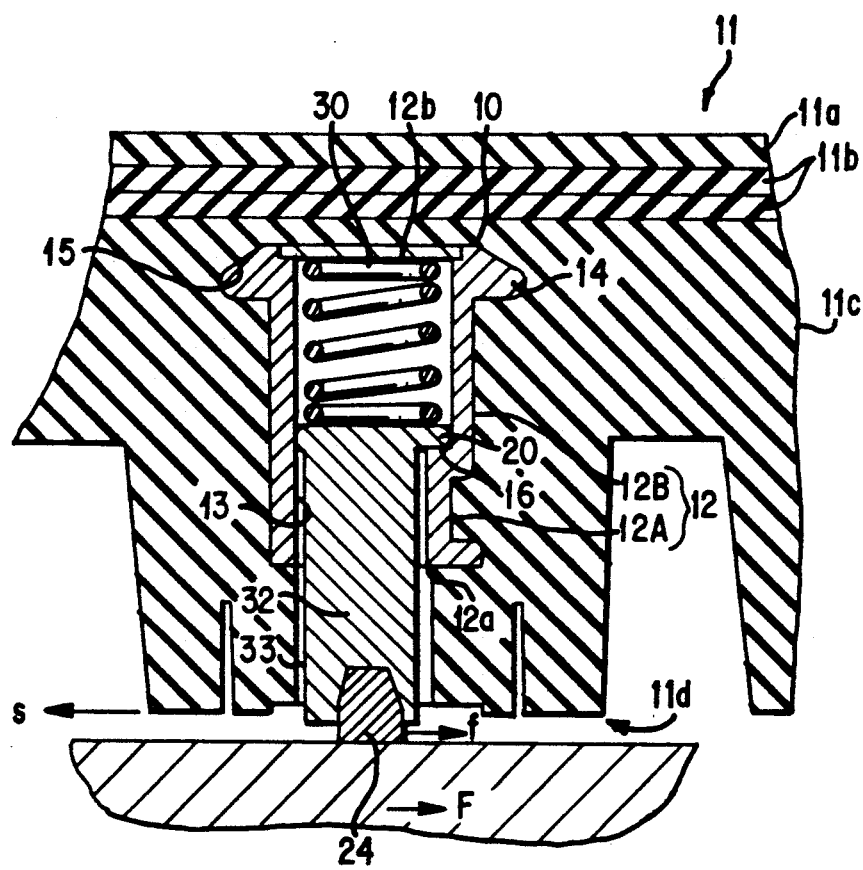
FIG. 1 is a sectional view of a part of a skid-proof tire of the present invention.
Figure 2:
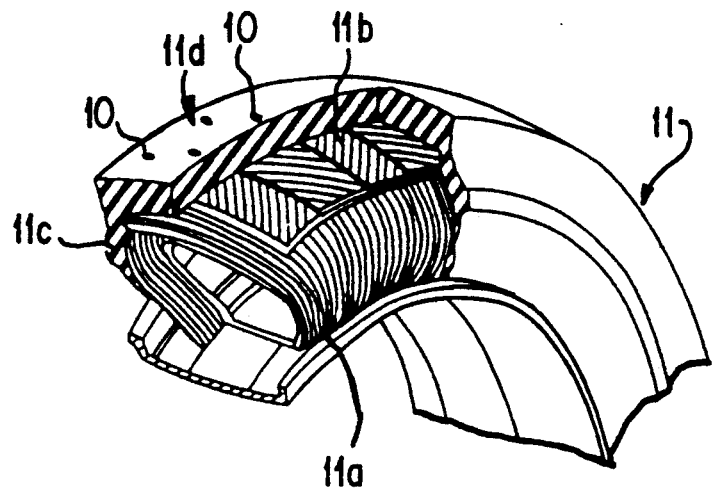
FIG. 2 is a partially cutaway view in perspective of the tire.

A tire 11 is composed of, as shown in FIGS. 1 and 2, a carcass 11a, breakers 11b superimposed as several layers on the outer face of the carcass 11a and a rubber layer 11c superimposed on the outer face of the breakers 11b. The rubber layer 11c is formed thick so as to support the weight of a vehicle and to bear shock and friction. There is formed a tread 11d on the outer circumferential face of the rubber layer 11c.

Figure 3:
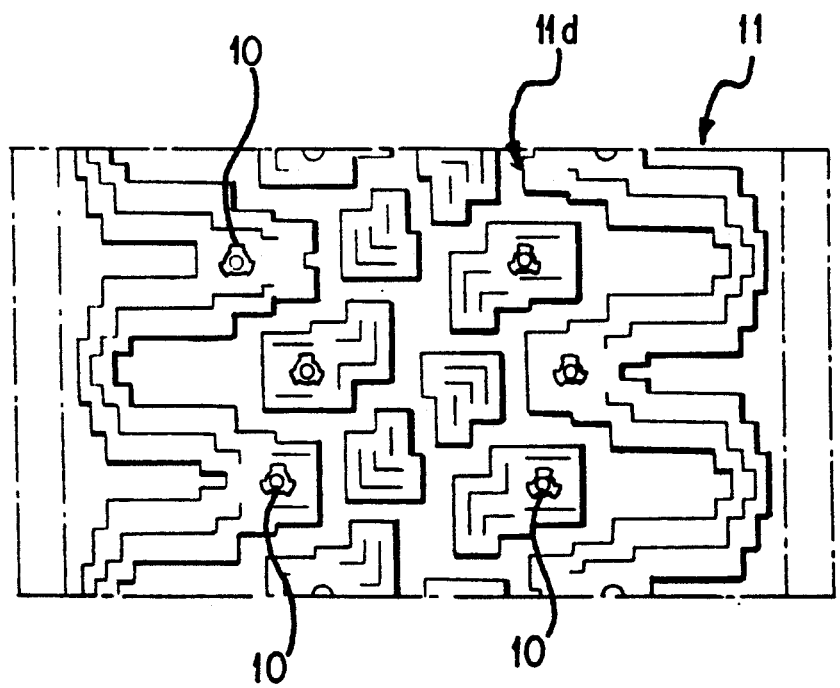
FIG. 3 is a partial plan view of the tire in which stud units are fixed in a tread.

There are bored multiple holes 15 (see FIG. 1) in all treads 11d, and stud units 10 are respectively fixed into the holes 15 (see FIG. 3).

As seen in FIG. 1, a cylinder 12, of which each stud unit 10 is composed, has a flange section 14 at the rear end (the end on the tire-center side). A stud 32 is inserted into each cylinder 12 with play.

Figure 4:
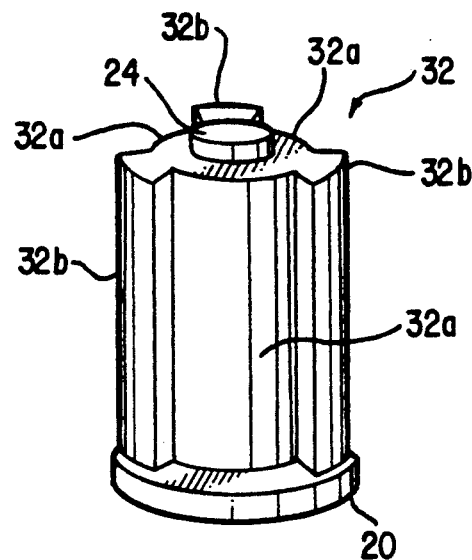
FIG. 4 is a perspective view of the stud.

The stud unit will be explained with reference to FIGS. 4 and 5. Three grooves 32a are formed on the circumference of the stud 32 in the axial direction thereof, so that three projections 32b are formed between the grooves on the circumference of the stud 32 in the axial direction thereof. The rear end of each groove 32a is closed; the front end thereof is open. The rear end section of the stud 32 is a stopper section 20. The radius of the stopper section 20 is slightly larger than the radius of the projections 32b. There is provided a hard tip 24 at the center of the front end face of each stud 32.

Figure 5:
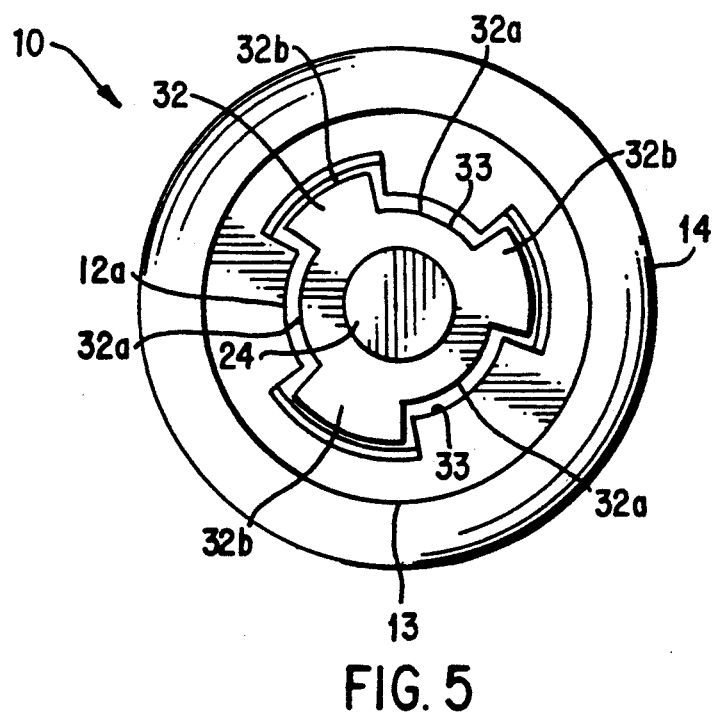
FIG. 5 is a bottom view of the stud unit.
Figure 6:
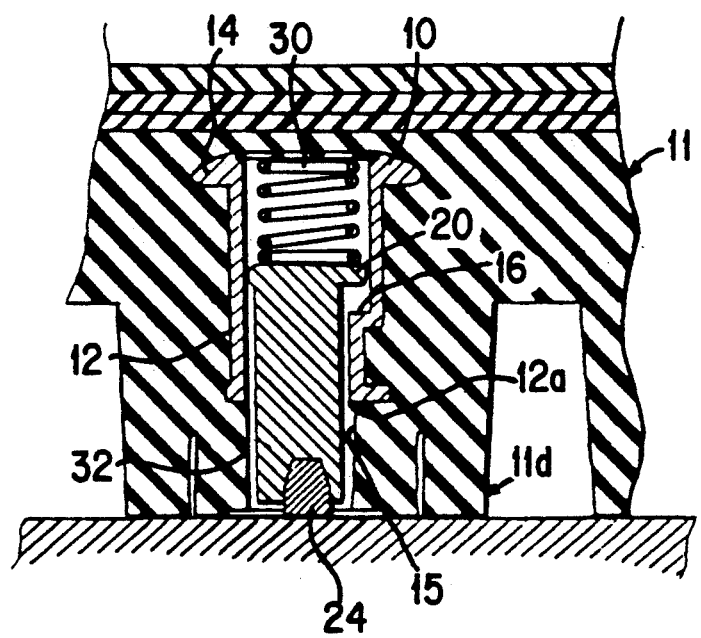
FIG. 6 is a partial sectional view of the tire whose stud unit contacts a road.

From midway to the front end of the cylinder 12 is a small-diameter generally cylindrical section 12A the inner circumference 13 of which is non-circular (FIG. 5). The circumference 13 corresponds to a non-circular circumference 33 of the stud 32. There is a narrow annular gap between the stud 32 and the small-diameter section 12A. The rear section of the cylinder 12 is a large-diameter cylindrical section 12B. There is formed a step 16 at the border between the small- and the large-diameter cylindrical sections 12A and 12B. The step 16 (FIG. 6) engages with the stopper section 20 so as to retain the stud 32.

There is provided a spring 30 as an elastic member between the rear end face of the stopper section 20 of the stud 32 and the bottom face 12b of the cylinder 12 so as to bias the stud 32 outward.

The stud units 10 are, as described above, fitted in the treads 11d of the tire 11 but the tip 24 and the front end section of each stud 32 project from the tread 11d. Alternatively, the stud units 10 may be so fitted in the treads 11d or so designed that only the tip 24 of the stud 32 projects from the tread 11d.

Successively, the function of the stud units, which are adapted for installation in a vehicle's tires, will be explained.

First, the case of dry road and fixed speed will be explained.

Rotating the tire 11, the front end of the studs 32 consecutively contact a surface of a road together with the tread 11d. The weight of the vehicle pushes the stud 32 contacting the road. The stud 32 contacting the road is pushed into the cylinder 12 against the elasticity of the spring 30 by the weight of the vehicle (see FIG. 6). At that time the stud 32 is biased outward by the elasticity of the spring 30 but the elasticity thereof is so small that the stud 32 does not damage the road.

If the stud 32 leaves the road with the rotation of the tire 11, the front end of the stud 32 is projected from the tread 11d by the spring 30.

On the dry road, the friction is large, so the tread 11d holds the surface of the road, so that whole of the torque of the tire 11 acts as a thrust. The stud 32 contacting the dry road receives the counter force from the road toward the center of the tire without receiving horizontal force for inclining the stud 32, whereby the stud 32 is smoothly retracted into the cylinder 12.

On the dry road, when the brake is applied, the friction is large, so the treads 11d hold the surface of the road without slip. Note that the braking shock is almost totally absorbed by the treads 11d, so only a quite small horizontal force acts on the front end of the stud 32 but the stud 32 is retracted into the cylinder 12 against the elasticity of the spring 30 by the weight of the vehicle when the stud contacts the road.

But on a snow- or ice-covered road, the tire is apt to slip because of low friction.

Figure 7:
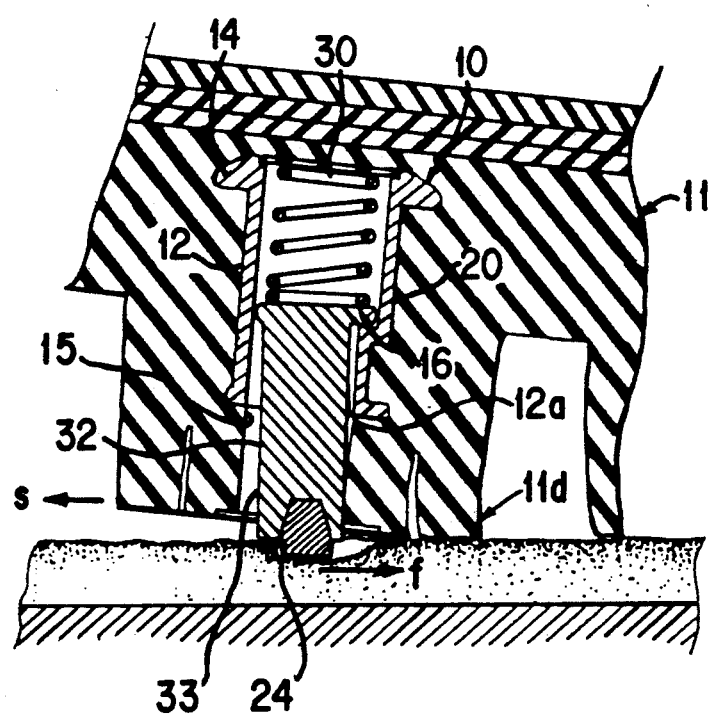
FIG. 7 is a partial sectional view of the tire when brake is applied.

At fixed speed the tire 11 does not slip even on the snow- or ice-covered road. The front end of the stud 32 contacting slightly bites the snow or ice surface because of biasing the stud 32 outward by the spring 30 (FIG. 7). Therefore, the stud 32 can maintain the frictional force even if the treads 11d of the tire 11 slip when the brake is applied.

If the brake is applied on such slippery road, the part of the treads 11d which contact the road slips in the S direction. At that time counter force f acts on the section of the tire contacting the road. The force f acts on the front ends of those studs 32 contacting the road when the treads 11d slip thereon.

The force f acting on the front end of the stud 32 contacting the road causes the stud 32 to incline in the direction counter to S and a section of the non-circular circumference of the stud 32 engages trailing section 12a of the non-circular inner circumference 13 of the cylinder 12 at the mount of the latter. The spring 30 partially compresses with inclination of the stud 32.

With this compressing and the aforementioned mutual engagement of sections of the non-circular circumferences 13 and 33, the stud 32 is kept projecting despite the weight of the vehicle acting to push the stud 32 inwardly of the tire. It is apparent that friction between the mutually engaging portions of the circumferences 13 and 33 resists pushing in of the stud 32. Note that, as described above, the front end of the stud 32, which is biased by the spring 30, slightly bites the surface of the snow- or ice-covered road, so that the studs 32 secure the braking action of the tire 11 (see FIG. 7).

As the speed of the tire 11 is reduced by braking the force f acting on the studs 32 contacting the road is also reduced and the treads 11d hold the surface of the snow- or ice-covered road at low speed and slipping is prevented. As the force f acting on the studs 32 contacting the road decreases, the projected length of the studs 32 contacting the road increases.

When the treads 11d of the tire 11 do not slip, the force f acting on the stud 32 contacting the road becomes small, so that the stud 32 retracts into the cylinder 12. When the vehicle stops, the force f disappears and the stud 32 receives the weight of the vehicle only. The front end of the stud 32 slightly bites the surface of snow or ice due to the elasticity of the spring 30.

When the inclined stud 32 biting the surface leaves the road, the horizontal force f disappears, and the compressed spring 30 springs back to the original form, whereupon the spring 30 presses the stopper section 20 to quickly return the stud 32 to the position in which the axis of the stud 32 coincides with the axis of the cylinder 12, so that the stud 32 projects.

In case of acceleration or starting on the snow- or ice-covered road, especially on a slope, the torque of the tire 11 acts on the road and the vehicle moves forward. If the tire 11 slips in the direction of S, the force f in the counter direction acts on the stud 32 contacting the road so that the stud 32 engages trailing section 12a at the mouth of the cylinder 12 as described hereinabove, and the stud 32 is thereby kept projecting to provide friction. Therefore, the slip of the tire 11 is quickly stopped.

In the above description, the stud 32 inclines and a portion of the non-circular circumference 33 of the stud 32 engages a portion of the non-circular inner circumference 13 of the cylinder 12 to keep the stud 32 projecting when the force f acts on the front end of the stud 32. Further, the non-circular circumference 33 of the stud 32 engages the trailing edge 12a of the non-circular inner circumference 13 of the cylinder 12 at the mouth of the latter.

Even if sand or the like enters the gap between the cylinder 12 and the stud 32 of the stud unit 10, the sand is removed because of the centrifugal force of the tire 11 rotating at high speed and the reciprocative movement of the stud 32. Also, when the brake is quickly applied, inertia causes engagement of a portion of the non-circular circumference 33 with the non-circular circumference 13 to prevent the stud 32 from retracting into the cylinder 12.

Next, other embodiments of the stud unit will be explained.

Figure 8:
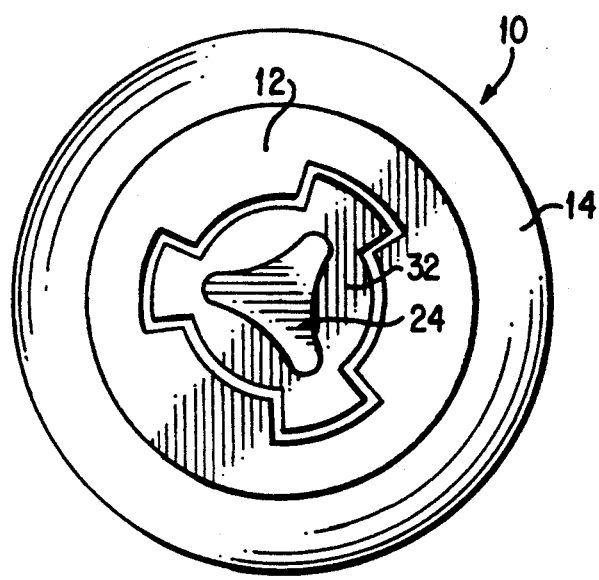
FIG. 8 is a bottom view of the stud unit having another tip.

In FIG. 8, the transverse sectional shape of the tip 24 at the front end of the stud 32 is substantially triangular.

Figure 9:
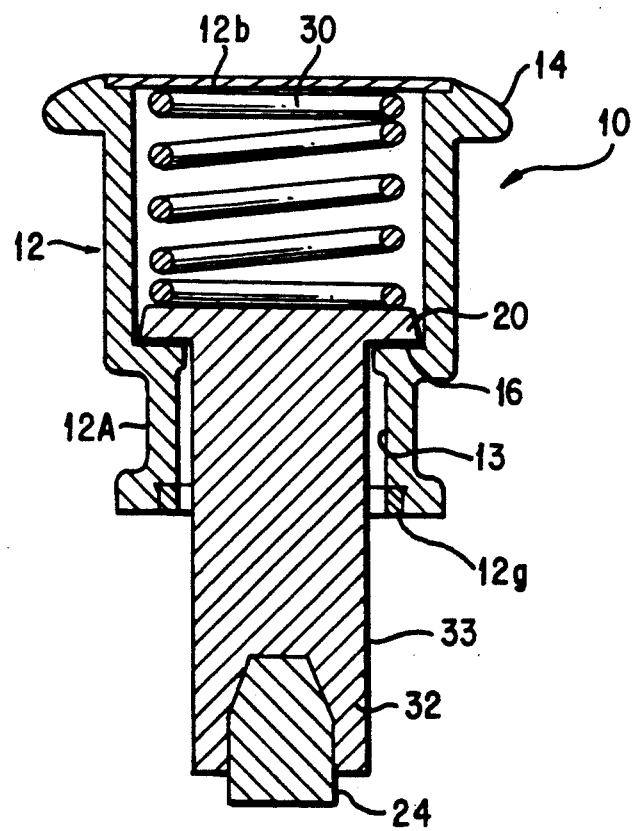
FIG. 9 is a longitudinal sectional view of the stud unit having a hard mouth piece at the fringe of the opening of the cylinder.

In FIG. 9, the cylinder 12 of the stud unit 10 has a mouth piece 12g, which is made of material harder than the material of the cylinder 12, at the mouth of the cylinder 12. In this embodiment, stopper section 20 is annular and projects radially inwardly of the small diameter section 12A of the cylinder 12 and the step 16 of the cylinder 12 with which the stopper section 20 engages is also annular.

Figure 10:
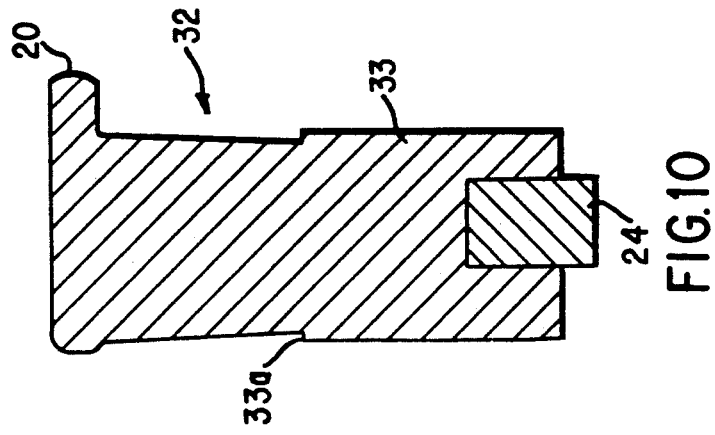
FIG. 10 is a longitudinal sectional view of the stud unit which has an annular engagement step formed thereon.

FIG. 10 is a longitudinal sectional view of the stud 32 of another embodiment of the stud unit 10. There is formed an annular engagement step 33a at the midway of the section of the stud 32 of non-circular circumference 33. The engagement step 33a engages with the lip of the mouth of cylinder 12 when the stud 32 inclines whereby in this embodiment not only friction between mutually engaging portions of the circumferences 33 and 13 maintains projection of the stud 32. In alternative embodiments, step 33a may be formed only on the projections 32b or the grooves 32a.

Figure 11B:
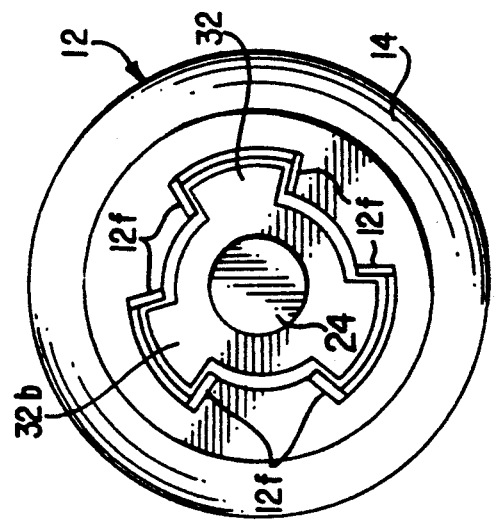
FIG. 11(b) is a bottom view of the stud supporting mechanism.
Figure 11A:
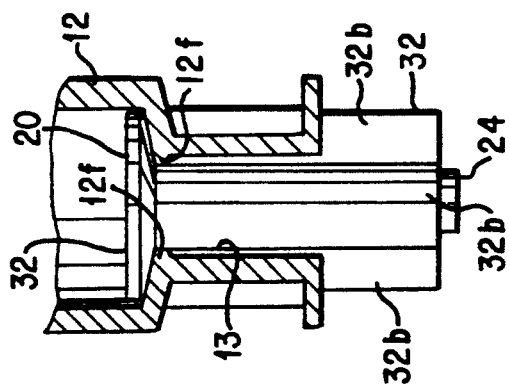
FIG. 11(a) is a partial sectional view of a stud supporting mechanism.

In FIG. 11(a) and (b), the cylinder 12 of the stud unit 10 has projections 12f, which support both sides of the projections 32b of the stud 32, at the step of the cylinder 12. The side faces of the projections 32b therefore do not contact the non-circular circumference 13 of the cylinder 12, so that the stud 32 can be moved smoothly.

Figure 12:
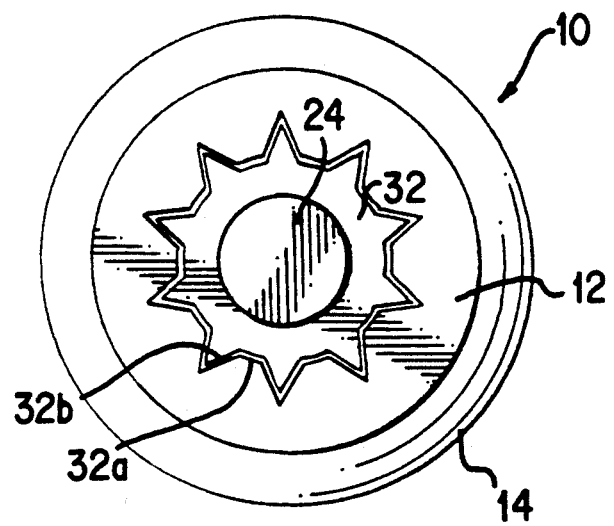
FIG. 12 is a bottom view of the stud unit with projections on the stud.

As seen in the embodiment of FIG. 12, the number of the projections 32b and grooves 32a of the stud are not limited but may be many.

Figure 13:
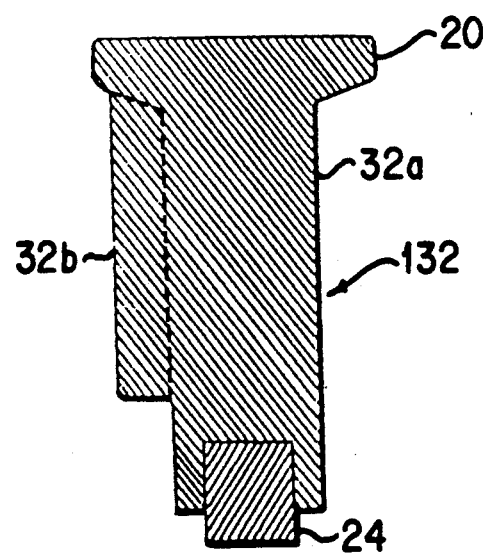
FIG. 13 is a longitudinal sectional view of the stud having no projections on the front end section.

In the embodiment of FIG. 13, projection 32b on the outer circumferential face of the stud 132 does not extend to the lower end. The projection 32b of the stud 132 is slidingly received in a corresponding groove in the small-diameter section 12A of the cylinder 12.

Figure 14:
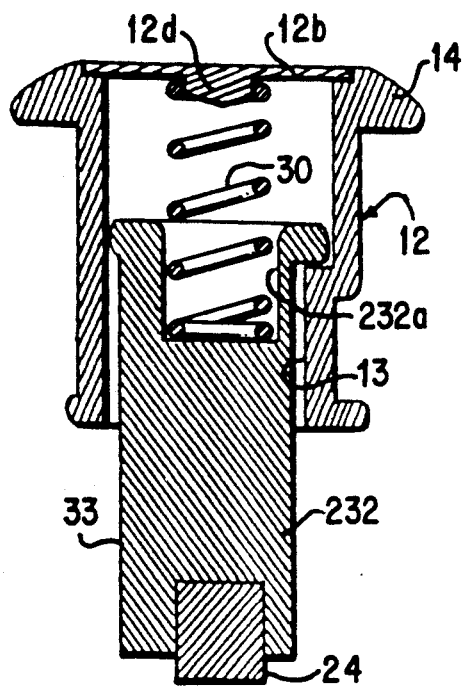
FIG. 14 is a longitudinal sectional view of the stud unit whose spring is differently located.

In the embodiment of FIG. 14 a hole 232a is bored in the axial direction of the stud 232 at the rear end thereof. The front end of the spring 30 is inserted into the hole 232a; the rear end of the spring 30 is fitted onto a projection on the bottom face 12b of the cylinder 12, so as not to move.

Figure 15:
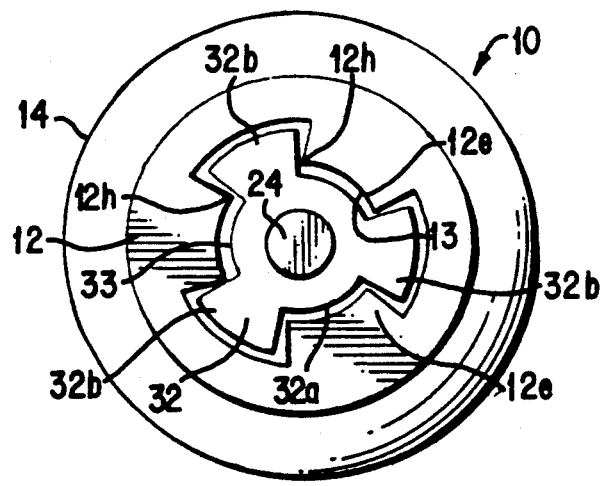
FIGS. 15–22 are bottom views of the stud units whose projections have various shapes.

In the embodiment of FIG. 15, the both edges 12h of each projection 12e of the small-diameter section 12A are formed by walls of the projection meeting at an acute angle and are, therefore, sharp. When the stud 32 inclines, the front ends of the sharp edges 12h engage portions of the non-circular circumference 33 of the stud 32 to keep the stud projecting due to friction between the edge 12h and the portion of the non-circular circumference engaged thereby.

Figure 16:
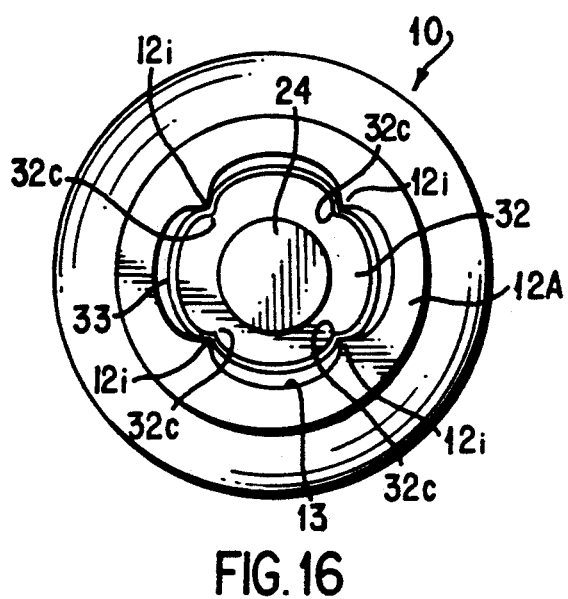

In the embodiment of FIG. 16, four narrow grooves 32c are formed in the stud 32 in the axial direction and on the outer circumferential face thereof; four projections 12i, whose ridges are formed sharp so as to fit in the grooves 32c of the stud 32, are formed on the inner face of the small-diameter section 12A of the cylinder 12. The front end of the ridge of a projection 12i engages the stud 32 so as to prevent the stud 32 from retracting into the cylinder 12 when the stud 32 inclines.

Figure 17:
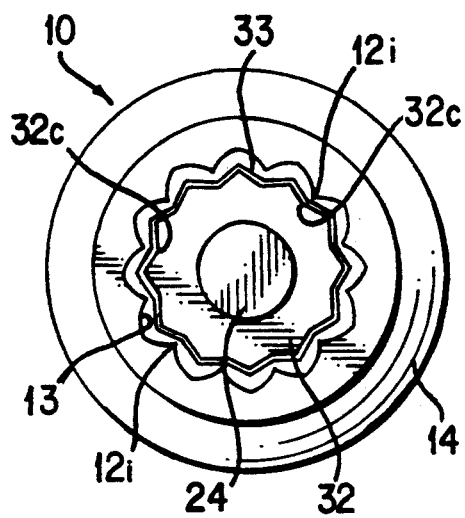

In the embodiment of FIG. 17, as compared to the embodiment of FIG. 16, sharp ridges are also formed on the stud 32 and grooves cooperating therewith on the cylinder 12.

Figure 18:
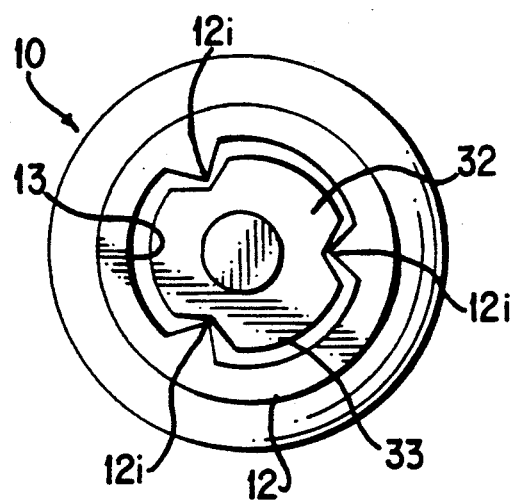
Figure 19:
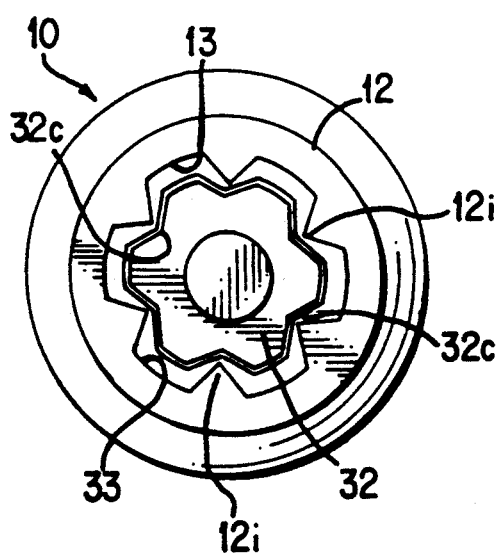
Figure 20:
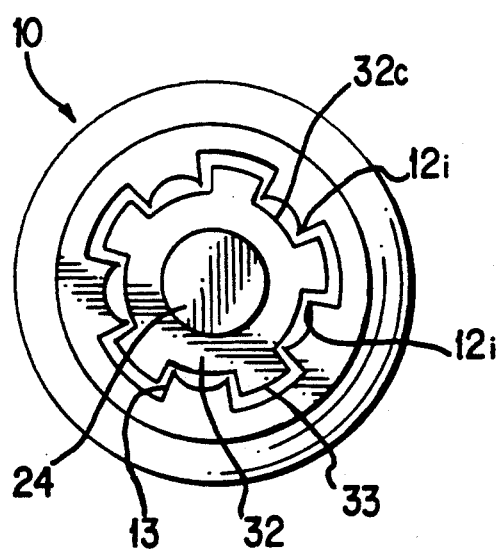

In FIGS. 18-20, the ridges of the projections of the cylinder 12 are formed as sharp as in the embodiments of FIGS. 16 and 17.

Figure 21:
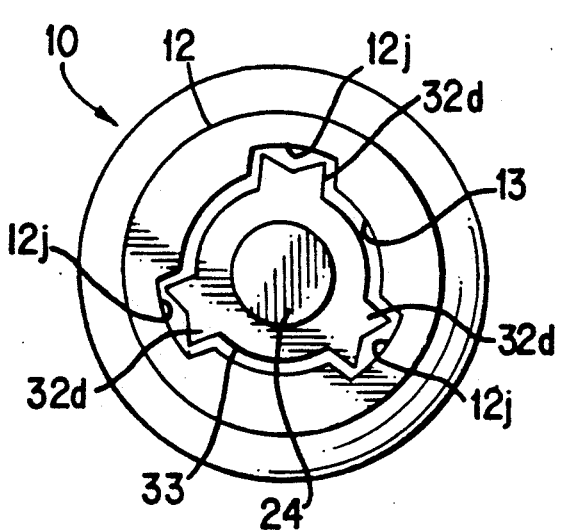

FIG. 21 is another embodiment of the projections. There are formed three grooves 12j on the inner face of the small-diameter section 12A; there are formed three projections 32d corresponding to the grooves 12j and each of which is comprised of two ridges. The two ridges of each projection 32d are sharp. When the stud 32 inclines, the front end of the ridges of a projection 32d engages the stud 32 so as to prevent the stud 32 from retracting into the cylinder 12.

Figure 22:
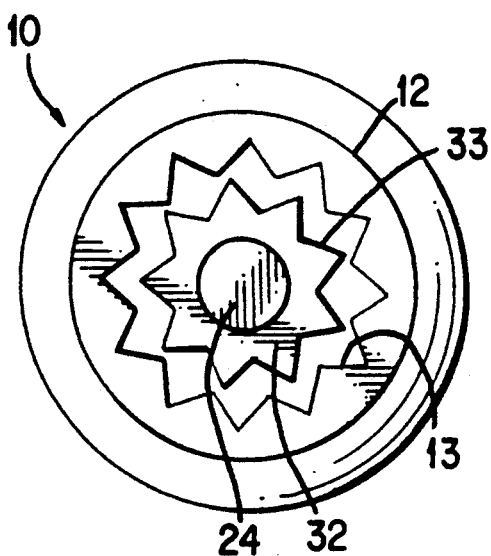
Figure 23:
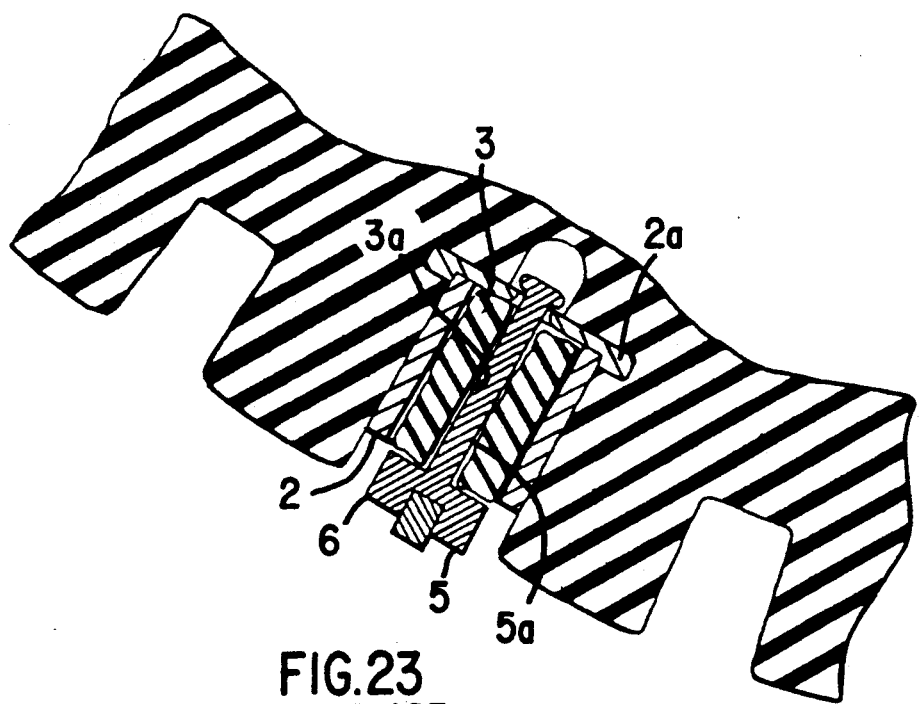
FIG. 23 shows a partial sectional view of a conventional snow tire with prior art studs.

FIG. 22 is another embodiment of the stud unit 10. There are formed projections and grooves in zigzag form on the inner face of the small-diameter section 12A of the cylinder 12, and the projections and grooves on the outer circumferential face of the stud are also formed in zigzag form. The stud 32 is inserted into the cylinder 12 with play. The largest outer diameter of the stud 32 is smaller than the smallest inner diameter of the small-diameter section 12A, so that the stud 32 has much play. With this much play, substantial inclination of the stud 32 is required before a portion of the front end of the non-circular circumference 33 of the stud 13 engages a portion of the non-circular inner circumference of the cylinder 12.

Note that, in all embodiments, a projection may be formed on the front end face of the stud instead of providing a separate tip. The cylinder and the stud may be made of ceramics or plastics. The elastic member can be not only the spring but a rubber member or the like.

Further, there may be formed slits in the axial direction of the cylinder on the outer circumferential face thereof so as to reduce the weight of the stud unit.

I claim:

1. A cylindrical stud unit adapted to be fixed in a cylindrical hole in a tread of a tire with the hole and the stud unit radially oriented with respect to the tire, comprising a stud inserted in a hollow cylinder, the cylinder having a closed end and an open end and an axially extending section the internal circumference of which is non-circular and is defined by alternating axially extending projections and grooves, the cylinder including means for axially fixing it in the hole in the treads with the closed end being the radially inner end with respect to the tire, and elastic means positioned with one extremity thereof engaging the closed end of the cylinder and an opposite extremity thereof engaging the inner end of the stud to bias the stud outwardly, the cylinder and the stud being provided with means defining surfaces which mutually engage to prevent further outward projection of the stud when the stud has been projected by the force of the elastic means so that the outer end of the stud projects slightly outwardly beyond the tread, the stud having an axially extending section substantially axially coextensive with the non-circular internal circumference section of the cylinder, the external circumference of the axially extending section of the stud being non-circular and being defined by alternating axially extending projections and grooves wherein the projections of the stud are between corresponding projections of the cylinder, the stud being received in the cylinder with play sufficient not only to enable the stud to reciprocate in the cylinder but to permit the stud to incline discernibly when a horizontal force is applied to the outer end of the stud due to its being in contact with a road surface upon which the tread is sliding, the horizontal force being applied to the end of the stud in a direction opposite to the direction of sliding of the tread, the inclination of the stud bringing a portion of the outer end of the section of the stud of non-circular circumference into engagement with a portion of the outer end of the section of the internal circumference of the cylinder which is non-circular thereby to retain the stud with its outer end projecting outwardly beyond the tread and biting into the road surface.

2. A cylindrical stud unit according to claim 1, in which the maximum diameter of the section of the stud of non-circular circumference is less than the minimum inner diameter of the section of the cylinder of non-circular inner circumference.

* * * * *